United States Patent [19]
Wagner, Jr.

[11] 3,896,144
[45] July 22, 1975

[54] PREPARATION OF 3,5-DIPHENYL-2-PYRAZOLIN-4-OL, 3,5-DIPHENYL-PYRAZOLE AND THE PHENYL-SUBSTITUTED DERIVATIVES THEREOF

[75] Inventor: Frank Albert Wagner, Jr., Pennington, N.J.

[73] Assignee: American Cyanamid Company, Stamford, Conn.

[22] Filed: July 13, 1973

[21] Appl. No.: 379,031

[52] U.S. Cl.... 260/310 R; 260/310 D; 260/348.5 R
[51] Int. Cl. ...................... C07d 49/10; C07d 49/18
[58] Field of Search .................... 260/310 R, 310 D

[56] References Cited
OTHER PUBLICATIONS

Huang–Minlon, et al., C. A. 63: 13350 (1965).
Tishchenko et al., C. A. 74: 13056a (1971).
Malinovskii, Epoxides & Their Derivs. (Davey, N.Y., 1965) pp. 49–52.

*Primary Examiner*—Henry R. Jiles
*Assistant Examiner*—C. M. S. Jaisle
*Attorney, Agent, or Firm*—Harry H. Kline

[57] ABSTRACT

There are provided processes for the preparation of 3,5-diphenyl-2-pyrazolin-4-ol, 3,5-diphenyl-pyrazole and the phenyl-substituted derivatives thereof. The compounds find utility as herbicides.

11 Claims, No Drawings

PREPARATION OF 3,5-DIPHENYL-2-PYRAZOLIN-4-OL, 3,5-DIPHENYL-PYRAZOLE AND THE PHENYL-SUBSTITUTED DERIVATIVES THEREOF

The present invention relates to a process for the preparation of pyrazolinol compounds having a formula:

(I)

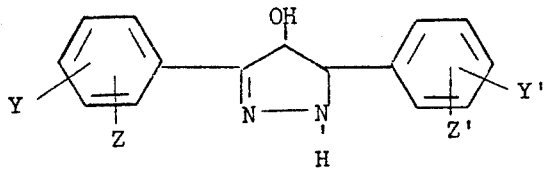

or pyrazole compounds having the formula:

(II)

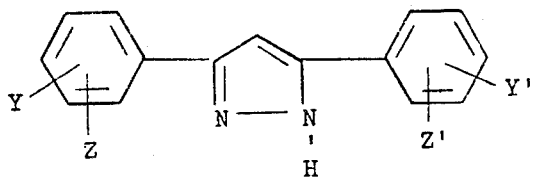

wherein Y, Y', Z and Z' each represents a member selected from the group consisting of hydrogen, halogen, nitro, alkyl $C_1$–$C_4$, haloalkyl $C_1$–$C_4$ having 1 to 4 halogens, and alkoxy $C_1$–$C_4$.

As used herein, the term "halogen" is intended to mean fluoro, chloro, bromo or iodo; "alkyl $C_1$–$C_4$" is intended to define straight and branched chain alkyl groups; "alkoxy $C_1$–$C_4$" is intended to include straight and branched chain alkoxy groups; and "haloalkyl $C_1$–$C_4$" is intended to include straight or branched chain alkyl groups substituted with from 1 to 4 halogen radicals selected from the group consisting of fluoro, chloro and bromo.

In accordance with this invention, an epoxyketone having the structure:

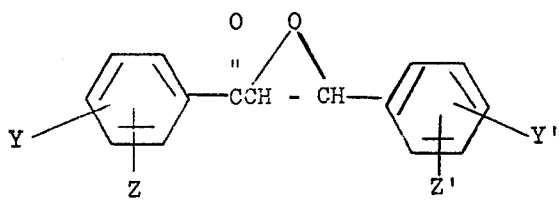

wherein Y, Y', Z and Z' are as defined above, can be prepared in high yields and good purity by reacting a chalcone having the formula:

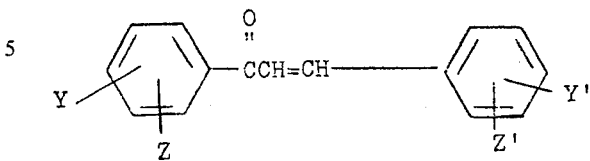

wherein Y, Y', Z and Z' are as defined above, with at least about an equimolar amount, or preferably an excess, i.e. from about one mole to about two mole equivalents, of aqueous hydrogen peroxide under pH conditions wherein the reaction mixture is maintained at about 8 to 11 throughout the course of the reaction. As the preferred method for maintaining said pH between 8 and 11, it is a good practice to add to the reaction mixture from about 0.5 to 2.0 molar equivalents, and preferably 0.5 to 1.0 mole equivalent, of a weak or medium-strength base selected from the group consisting of sodium carbonate, sodium bicarbonate, potassium carbonate, potassium bicarbonate, and mixtures thereof. The base can be used in its hydrated or anhydrous form, or it can be used as an aqueous solution.

In general, the foregoing reaction is carried out in the presence of water and an organic solvent possessing an appreciable water solubility at a temperature between 0°C. and 60°C., and preferably between 15°C. and 35°C. Exemplary solvents are, for instance, aliphatic alcohols $C_1$–$C_6$ (preferably $C_1$–$C_3$), carbitols $C_5$–$C_8$, cellosolves $C_4$–$C_6$, glymes $C_4$–$C_{10}$, aliphatic ketones $C_3$–$C_5$, ethylene glycol or propylene glycol. When the reaction is completed, usually within about 30 to 60 minutes, the crystalline product is separated from the reaction mixture, washed with water, partitioned between an organic solvent (e.g. toluene) and water, the organic phase dried and the solvent removed, generally under reduced pressure.

The epoxyketone, thus-formed, is next reacted in the presence of a selected organic solvent with from about 1 to 2 mole equivalents of hydrazine, hydrazine monohydrate or an aqueous solution thereof. The overall reaction is apparently an acid-catalyzed reaction and is preferably carried out in the presence of a strong acid catalyst, although weak acids may also be employed but with less advantage. In protic solvents, such as alcohols or glycols, the pyrazolinol (I) compound may be formed in the absence of acid or even in the presence of bases, but the use of acid is advantageous to effect the conversion to the pyrazole (II) compound.

Illustrative acids employed in the foregoing reaction include common mineral acids such as hydrochloric, hydrofluoric, hydrobromic, sulfuric, nitric, phosphoric and organic sulfonic acids, such as p-toluenesulfonic acid, methanesulfonic acid, benzenesulfonic acid and alkyl-substituted benzenesulfonic acid. The preferred acids are any of the organic sulfonic acids, sulfuric acid and hydrochloric acid.

Suitable solvents for the above reaction include $C_1$–$C_6$ alcohols, aromatic hydrocarbon solvents, such as toluene, xylene, benzene, chlorinated aromatic hydrocarbon solvents, such as orthodichlorobenzene, cyclic ethers, such as tetrahydrofuran and dioxane, and glycols, such as ethylene glycol and propylene glycol. Preferred solvents for this reaction are aromatic hydrocarbon solvents and chlorinated aromatic hydrocarbon solvents.

In the event that the foregoing reaction is carried out at a relatively low temperature, for example between about 20°C. and 100°C., and preferably between about 20°C. and 50°C., the formula (I) pyrazolinol, shown above, is formed. This product can be separated from the reaction mixture and recovered as such. Alternatively, it can be converted directly to the corresponding formula (II) pyrazole, also depicted above. When the reaction is carried out at a temperature between about 125°C. and 225°C. in the presence of a relatively high-boiling solvent (i.e. 125°C. to 225°C.), such as xylene or ortho-dichlorobenzene, the reaction mixture is simply heated to reflux and the water present in the reaction mixture azeotropically distilled along with any residual hydrazine. The formula (II) pyrazole is thus obtained.

In an alternative procedure, where the pyrazolinol of formula (I) is isolated from the reaction mixture, it can be converted to pyrazole (II) compounds by heating the same in relatively high-boiling solvents, such as $C_4$-$C_7$ aliphatic ketones.

It is known that the intermediate compound, 2,3-epoxy-3-phenylpropiophenone, can be prepared by epoxidation of chalcone with alkaline hydrogen peroxide. However, the reaction conditions disclosed in prior procedures involved the use of a strong base; for example, sodium hydroxide or isolated sodium peroxide. In fact, S. N. Lewis in "Oxidation," Volume 1, page 230, published by M. Dekker Inc., New York (1969) states that one-half equivalent of 6N sodium hydroxide per equivalent of $\alpha,\beta$-unsaturated ketone is required for effective epoxidation thereof. Although prior procedures have met with some success, they nevertheless are not wholly satisfactory, since they typically provide either high yields of impure product or low yields of pure product.

In contrast to the prior procedures, it has been found that consistently high yields of high purity product can be obtained by maintaining the pH of the reaction mixture at about 8 to 11, a preferred method of which involves the use of bases which are significantly weaker than alkali metal hydroxides. In order to obtain reproducibly high yield and high purity product, it is critical to avoid the use of alkali metal hydroxide bases throughout. The success of this preferred process of the invention is further surprising in that the bases used herein, i.e. sodium carbonate, sodium bicarbonate, potassium carbonate, potassium bicarbonate, calcium carbonate, magnesium carbonate, barium carbonate or mixtures thereof, may not be completely dissolved during the course of the reactions. The bases can also be used to advantage to destroy residual peroxide at the end of the reaction procedure. Such a process has the distinct advantage that control of reaction temperature is not critical.

The advantage of the epoxidation process is further demonstrated by the finding that the above-mentioned procedure can provide somewhat comparable results to those obtained with the process of the present invention. This is accomplished provided the procedure is modified in such a way as to maintain the pH of the reaction mixture in the range of about 8 to about 11 during the course of the overall reaction. This modification is, itself, an improvement over the prior art process. The requirements are that sufficient base of sufficient strength be added to initially obtain a pH in the stated range, and then to maintain the pH within this range during the reaction. A complication in the use of alkali metal hydroxide is that the chalcone consumes base initially because it behaves as a weak acid. It is, therefore, necessary to add about one-half equivalent of strong base per equivalent of chalcone to obtain a starting pH sufficient for epoxidation to begin. As epoxidation occurs, chalcone is consumed, and the reaction mixture pH rises rapidly, since the epoxyketone is less acidic than the chalcone. With the liberation of base into the reaction medium, the base competes with chalcone for the peroxide, resulting in the decomposition of the peroxide. Further, the base attacks the epoxyketone, resulting in destruction of this desired product. Significantly, the process of the present invention minimizes or avoids the aforementioned complications.

Clearly, any equivalent method for the pH control during epoxidation is within the purview of the present invention. One such method involves an initial addition of strong base and titration to pH about 8 to 11 with an acid, as the reaction proceeds. Another involves the use of various buffer systems.

It should be noted that, although trans-chalcones have been employed herein, the use of cis-chalcone will also yield the trans-epoxide under basic epoxidation conditions.

Solvents other than methanol may be used; for example, ethanol, isopropanol or acetone. The reaction of hydrazine and the epoxyketone trans-2,3-epoxy-3-phenylpropiophenone in ethanol is reported in the literature. Under these conditions (heating in ethanol), 3,5-diphenyl-2-pyrazolin-4-ol is formed. Although hydrazine hydrate and aromatic hydrocarbons are not mutually soluble, conversion of epoxyketones to pyrazolinols can be effected in such heterogeneous reaction media in good yield. In ethanol, without acid catalyst, 42 and 47% yields of 3,5-diphenyl-2-pyrazolin-4-ol have been obtained; whereas, the same reaction in the presence of acid catalyst yields approximately 74% of said product. Similar results also are obtained in an heterogeneous system containing an aromatic hydrocarbon, conducted under similar conditions.

The effect of the amount of acid catalyst used in the present process appears to be critical. In general, it is desirable to use between about 1 wt. percent to 10 wt. percent of the acid catalyst based on the amount of epoxyketone used. When the reaction is carried out in the absence of acid catalyst, product yields are generally below 50%; whereas, with about 2 wt.% of catalyst, yields are increased to about 65%, and with about 9 wt.%, they are further improved to about 74%. When the wt. percent of acid catalyst exceeds about 10%, however, side reactions frequently occur and product yields are diminished.

In practice, it is found that it is not necessary to dry epoxyketone filter cake prior to reaction with hydrazine. It is, however, shown that the order of addition of epoxyketone and hydrazine to the reaction mixture is important if extended addition times are employed. If the epoxyketone is added to the hydrazine rather than adding the hydrazine to the epoxyketone, higher yields of pyrazole can be obtained. In all events, the pyrazole obtained is of high purity. Where larger amounts of acid catalyst are employed, the catalyst may appear as a salt of a corresponding molar amount of the pyrazole in the filtered solids. If desired, the catalyst may be removed therefrom by thoroughly mixing the pyrazole-aromatic hydrocarbon suspension at room temperature with aqueous base, cooling to from 0°C. to 50°C., filtering, washing the filter cake with water, then washing the latter treated cake with a cold aromatic hydrocarbon or hexane, and drying.

Advantageously, the formation of the pyrzaolinols (I) may be effected in such aromatic hydrocarbons as benzene or toluene. It is desirable to use a high-boiling solvent, such as xylene or 1,2-dichlorobenzene to effect dehydration to the final pyrazoles. This is the reason for the use of xylene in all the reaction stages. The use of xylene permits the reaction sequence to be run in one reaction vessel, without transfer and without isolation of intermediates. Alternatively, if the dehydration step is run under pressure so that a temperature suitable for the dehydration can be obtained, the whole sequence may be run in a lower-boiling reaction solvent such as toluene. Alternatively, the pyrazolinol may be formed and dehydrated in a solvent such as alcohol, or it may be formed in a solvent such as benzene or toluene, then isolated, and then dehydrated in a more polar solvent such as methyl isobutyl ketone under which conditions the rate of dehydration is considerably faster.

The process of the present invention provides a novel, effective and highly advantageous means for preparing 3,5-diphenylpyrazole and derivatives thereof. These compounds are known in the art and have utility as intermediates for the preparation of 1,2-dialkyl-3,5-diphenyl(substituted or unsubstituted) pyrazolium salts which are highly effective herbicidal agents. Said compounds are particularly effective for controlling wild oats in the presence of small grains such as barley, wheat, rape and rye.

The herbicidally active pyrazolium salts have the formula:

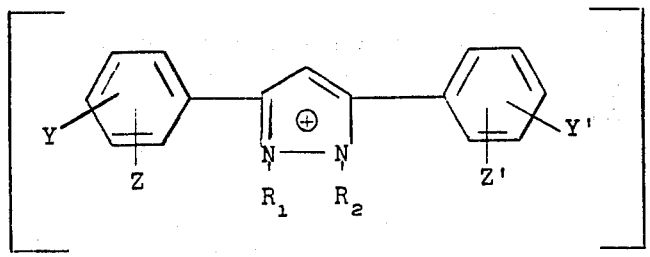

wherein $R_1$ and $R_2$ are alkyl $C_1$–$C_4$; Y, Y′, Z and Z′ each represents a member selected from the group consisting of hydrogen, nitro, halogen, alkyl $C_1$–$C_4$, haloalkyl $C_1$–$C_4$ containing 1 to 4 halogen groups and alkoxy $C_1$–$C_4$; X is an anion having a charge of from 1 to 3; and m is an integer selected from 1, 2 and 3; and can be prepared by reacting a compound of the formula:

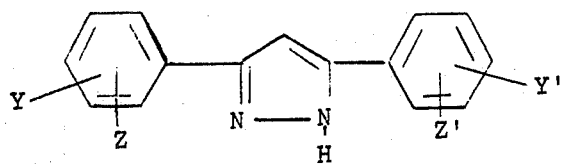

wherein Y, Y′, Z and Z′ are as defined above; with from 1 to 1.5 mole equivalents of an alkylating agent represented by the formula $(R_1)_mX$, wherein $R_1$, m and X are as described above; said reaction being conducted in the presence of a solid, anhydrous, inorganic, alkali metal base and a non-aqueous, inert, organic solvent at a temperature between 50°C. and 175°C. (preferably 85°C. to 120°C.) to obtain a compound having the formula:

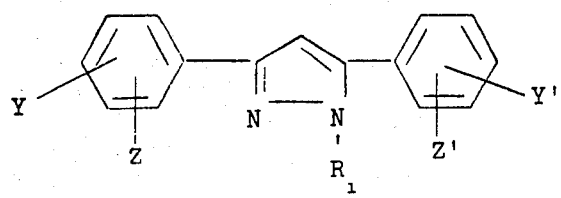

wherein Y, Y′, Z, Z′ and $R_1$ are as defined above; and reacting said compound with from about 1 to 1.5 mole equivalents of an alkylating agent of the formula $(R_2)_mX$, wherein $R_2$, m and X are as described above, in the presence of a non-aqueous mixture of inert, organic solvents consisting of (a) a chlorinated hydrocarbon solvent such as ethylene dichloride or chloroform, and (b) an organic solvent selected from the group consisting of aromatic hydrocarbons, aliphatic hydrocarbons, ketones, alcohols, dipolar aprotic solvents, cyclic ethers and alkoxyalkyl ethers, at a temperature between about 50°C. and 175°C. (preferably 60°C. to 150°C.), whereby the above-identified product is obtained.

In these latter steps for the conversion of the formula (II) pyrazole to the herbicidally active pyrazolium salts, suitable alkylating reagents include: alkyl halides, alkyl sulfates, dialkyl sulfates, alkyl phosphates, alkyl hydrogen sulfates, and alkyl toluene sulfonates; with these alkylating agents, said alkyl groups have from 1 to 4 carbon atoms. Among the preferred alkylating reagents are: alkyl halides such as methyl, ethyl, n-propyl, isopropyl, N-butyl, and isobutyl and bromides; alkyl sulfates, dialkyl sulfates, alkyl hydrogen sulfates, and alkyl toluene sulfonates.

Suitable solvents are non-aqueous, inert, organic solvents, preferably selected from aromatic hydrocarbons such as toluene and xylene; aliphatic hydrocarbons such as heptane; ketones having from 4 to 7 carbon atoms such as methyl isobutyl ketone, methyl butyl ketone, cyclohexanone, or the like; alcohols having from 2 to 8 carbon atoms, and preferably 3 to 4 carbon atoms; dipolar aprotic solvents such as dimethylsulfoxide, dimethylformamide, acetonitrile, nitrobenzene, N,N-dimethylacetamide, tetrahydrosulfolane; ethylene dichloride; alkoxyalkyl ethers, such as bis-methoxy ethyl ether; and cyclic ethers such as dioxane and tetrahydrofuran.

Suitable bases for use in the initial alkylation step are solid, anhydrous, inorganic, alkali metal bases. They are moderate to strong bases and preferably selected from the group consisting of sodium hydroxide, potassium hydroxide, sodium carbonate and potassium carbonate.

Illustrative of the anions which are suitable for use in the present invention may be mentioned, for example, halides such as chloride, bromide or iodide; sulfate; hydrogen sulfate; methyl sulfate; benzene sulfonate; $C_1-C_4$ alkoxy benzene sulfonate; $C_1-C_3$ alkyl benzene sulfonate, preferably a toluene sulfonate, such as p-toluene sulfonate; phosphate; alkane sulfonate $C_1-C_4$.

With regard to the pyrzolium salts, it is to be understood that certain multivalent anions such as sulfate, phosphate, and the like, may have associated with them a cation in addition to the pyrazolium cation; as for example, a proton or an alkali metal or alkaline earth metal. For simplicity, such anions are portrayed as being unionized, although they probably are, in fact, further ionized. Typical representations are: $NaSO_4^-$, $KPO_4^-$, $MgPO_4^-$, $HSO_4^-$, $NaHPO_4^-$, and the like.

The process of the present invention is further illustrated by the examples provided below.

EXAMPLE 1

Preparation of 2,3Epoxy-3-phenylpropiophenone

To a suspension of 41.65 g. (0.200 mole) of chalcone in 136 ml. of absolute methanol is added 16.52 g. of potassium carbonate sesquihydrate. Twenty-five ml. (0.250 mole, 25% excess) of 31% hydrogen peroxide is added during 15 minutes, with the reaction mixture temperature being maintained at about 25°C. with a cooling bath. After addition is complete, the mixture is stirred at 25°C. for 45 minutes. The white, crystalline product is collected and washed with water.

The product is partitioned between 350 ml. toluene and 50 ml. water, and the organic phase is dried (magnesium sulfate) and the solvent removed under reduced pressure to give 40.1 g. (89.3%) of white solids with melting point 86.5°C. to 88.5°C.

EXAMPLE 2

Preparation of 2,3Epoxy-3-phenylpropiophenone

The reaction is conducted exactly as in Example 1, substituting 20.0 g. (0.200 mole) of potassium bicarbonate for the potassium carbonate sesquihydrate. After addition of the peroxide is completed, the mixture is stirred at room temperature for 2 hours. Work-up, as in the above Example 1, gives 41.4 g. (92.3%) of white solids with melting point 86.0°C. to 88.0°C.

EXAMPLE 3

Preparation of 2,3-Epoxy-3-phenylpropiophenone

To a vigorously stirred suspension of 41.65 g. (0.200 mole) of chalcone, 20.0 g. (0.200 mole) of potassium bicarbonated, 136 ml. of absolute methanol and 8.5 ml. of water is rapidly added 25 ml. (0.250 mole, 25% excess) of 31% hydrogen peroxide. The exotherm is very slow, so the mixture is gently heated. Ultimately, the reaction mixture is placed in a 40°C. heating bath, and the exotherm slowly raises the mixture temperature to 56°C. and then subsides. The mixture is cooled to room temperature and the white crystals are collected, washed thoroughly with 300 ml. of water, and dried. There is obtained 41.6 g. (92.6%) of white solids with melting point 86.0°C. to 87.5°C.; a clear melt is observed, with no evidence for the presence of residual potassium bicarbonate.

EXAMPLE 4

Preparation of 2,3-Epoxy-3-phenylpropiophenone

The reaction is conducted exactly as in Example 1, except that 10.0 g. (0.100 mole) of potassium bicarbonate is added in addition to the potassium carbonate sesquihydrate. After addition of the peroxide is completed, the mixture is stirred at room temperature for 1.5 hours. Work-up, as in Example 1, gives 40.6 g. (90.3%) of white solids with melting point 86.5°C. to 88.5°C.

EXAMPLE 5

Preparation of 2,3-Epoxy-3-phenylpropiophenone

A mixture of 41.65 g. (0.200 mole) of chalcone, 20.0 g. (0.200 mole) of potassium bicarbonate, 136 ml. of absolute methanol and 8.5 ml. of water is heated to 45°C. Hydrogen peroxide (25 ml. of 31%, 0.250 mole, 25% excess) is added, with cooling, at such a rate as to maintain the reaction mixture temperature at 45°C. to 50°C. With modest tap water cooling, this addition requires 15 minutes. The product begins to crystallize at the end of the addition. The mixture is maintained at 45°C. to 50°C. for one hour; a negative peroxide test is obtained with starch-iodide paper well before the end of this heating period. The mixture is cooled to room temperature, filtered, and the filter cake is washed thoroughly with 300 ml. of water, and dried. There is obtained 41.2 g. (91.6%) of white crystals with melting point 86.5°C. to 88.5°C., clear melt.

EXAMPLE 6

Preparation of 3,5-Diphenyl-2-pyrazolin-4-ol

To a suspension of 11.2 g. (0.050 mole) of the epoxyketone in 50 ml. of 95% alcohol is added 2.5 ml. (0.05 mole) of hydrazine hydrate and several crystals of p-toluenesulfonic acid monohydrate. The mixture is heated at reflux for a total of 50 minutes, and the solids isolated at room temperature. There is obtained 8.80 g. (73.9%) of crystals with melting point 208°C. to 211°C.

EXAMPLE 7

Preparation of 3,5-Diphenyl-2-pyrazolin-4-ol

A mixture of 18.95 g. (0.0845 mole) of the epoxyketone, 59 ml. of mixed xylenes and 21 ml. of water is heated at 50°C., resulting in dissolution of the epoxyketone in the xylene phase. The aqueous phase is removed from the vessel (the epoxyketone is insoluble) and discarded. To the wet xylenes solution is added, at 50°C., 0.38 g. (2 wt. percent, based on epoxyketone) of p-toluenesulfonic acid monohydrate and 6.18 ml. (0.127 mole, 50% excess) of hydrazine hydrate. The mixture is heated at 50°C. for one hour and then at reflux (about 100°C.) overnight. The mixture is cooled to 3°C., the solids are collected and washed with water, then with cold xylenes, and dried.

There is obtained 13.9 g. (68.8%) of the pyrazolinol, still contaminated with a trace of acid; melting point 174°C. with vigorous gas ($H_2O$) evolution and formation of the pyrazole, resolidification and a melting point of from 198°C. to 200°C.

EXAMPLE 8

Preparation of 3,5-Diphenylpyrazole

The reaction is run on the same scale and exactly as in Example 7. After heating at 50°C. for 1 hour, the water is removed by azeotropic distillation. The reaction is cooled to 3°C. and the crystal crop collected, washed with hexane and dried. There is obtained 14.1 g. (correcting for the catalyst present, 13.7 g. 73.7%) of light yellow crystals with melting point 196°C. to 201°C. In this reaction, 4.5 g. (9 wt percent of p-toluenesulfonic acid based on the amount of epoxyketone) is used.

When the reaction above is repeated in every detail but using 1 g. of p-toluenesulfonic acid (2 wt percent based on the epoxyketone), a 64.8% yield of 2,3-diphenylpyrazole is obtained.

14.5 g. (correcting for the catalyst present, 14.1 g., 75.8%) of cream-colored crystals with melting point 197.5°C. to 201.5°C.

EXAMPLE 11

Preparation of Substituted 3,5-Diphenylpyrazoles

Following the procedure of Example 1, but substituting the appropriately substituted chalcone for chalcone in said reaction, yields the corresponding substituted 2,3-epoxy-3-phenylpropiophenone which is then converted by the procedure of Example 8 to the corresponding substituted 3,5-diphenylpyrazole (II), reported in Table I below.

TABLE I
Substituted 3,5-Diphenylpyrazoles Having the
Following Formula Prepared by the Above Procedure:

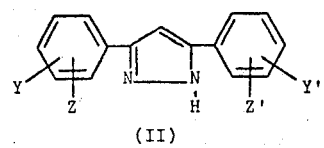

(II)

| Substituent | | | | Substituent | | | | Substituent | | | |
|---|---|---|---|---|---|---|---|---|---|---|---|
| Y | Y' | Z | Z' | Y | Y' | Z | Z' | Y | Y' | Z | Z' |
| H | H | H | H | CH$_3$O (2) | H | H | H | Cl (3) | CH$_3$ (2) | H | H |
| Cl (2) | H | H | H | CH$_3$O (3) | H | H | H | Cl (4) | CH$_3$O (4) | H | H |
| Cl (3) | H | H | H | CH$_3$O (4) | H | H | H | Cl (2) | CH$_3$O (2) | Cl (4) | CH$_3$O (5) |
| Cl (4) | H | H | H | Cl (2) | Cl (2) | H | H | CH$_3$ (2) | CH$_3$ (2) | H | H |
| F (2) | H | H | H | Cl (2) | Cl (4) | H | H | CH$_3$ (2) | CH$_3$ (3) | H | H |
| F (3) | H | H | H | Cl (3) | Cl (3) | H | H | CH$_3$ (2) | CH$_3$ (4) | H | H |
| F (4) | H | H | H | Cl (4) | Cl (4) | H | H | CH$_3$ (3) | CH$_3$ (3) | H | H |
| Br (4) | H | H | H | Cl (2) | H | Cl (5) | H | CH$_3$ (3) | CH$_3$ (4) | H | H |
| CH$_3$ (2) | H | H | H | Cl (3) | H | Cl (4) | H | CH$_3$ (4) | CH$_3$ (4) | H | H |
| CH$_3$ (3) | H | H | H | Cl (3) | H | Cl (5) | H | CH$_3$ (3) | H | CH$_3$ (5) | H |
| CH$_3$ (4) | H | H | H | F (2) | F (4) | H | H | NO$_2$ (4) | NO$_2$ (4) | H | H |
| CF$_3$ (3) | H | H | H | F (3) | F (3) | H | H | CH$_3$O (2) | H | CH$_3$O (5) | H |
| (CH$_3$)$_3$C (4) | H | H | H | F (4) | F (4) | H | H | CH$_3$O (4) | CH$_3$O(4) | H | H |
| NO$_2$ (3) | H | H | H | Cl (2) | CH$_3$ (3) | H | H | | | | |

EXAMPLE 9

Preparation of 3,5-Diphenylpyrazole

The reaction is run on the same scale and exactly as in Example 7, except that the mixture is not held at 50°C. after addition of the catalyst and hydrazine hydrate. The mixture is heated at 100°C. for one hour and then dried by azeotropic distillation. There is obtained 14.2 g. (correcting for the catalyst present, 13.8 g., 74.3%) of tan crystals with melting point 195°C. to 201°C.

EXAMPLE 10

Preparation of 3,5-Diphenylpyrazole

To 18.95 g. (0.0845 mole) of the epoxyketone is added 1.9 ml. of water, and the sample is thoroughly homogenized to simulate a wet filter cake containing 10 wt percent water. This sample is added during 30 minutes to a mixture of 59 ml. of mixed xylenes, 0.38 g. (2 wt percent, based on dry epoxyketone) of p-toluenesulfonic acid monohydrate and 6.18 ml. (0.127 mole, 50% excess) of hydrazine hydrate. The mixture is heated at reflux for 1 hour and then dried by azeotropic distillation. Cooling, ultimately to 3°C., gives

I claim:
1. A process for the preparation of compounds having a formula selected from the group consisting of:

(I)
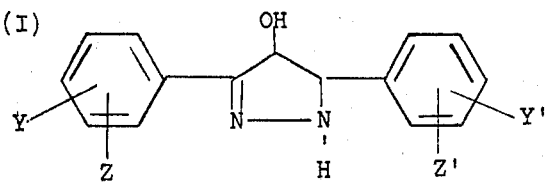

and (II)
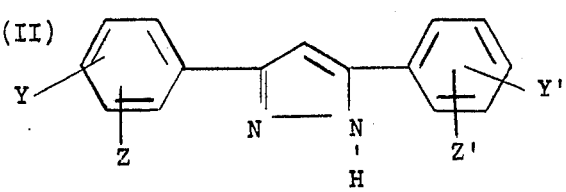

wherein Y, Y', Z and Z' each represents members selected from the group consisting of hydrogen, halogen, nitro, alkyl $C_1$–$C_4$, haloalkyl $C_1$–$C_4$ having 1 to 4 halogens and alkoxy $C_1$–$C_4$; which comprises the steps of: reacting a compound having the formula:

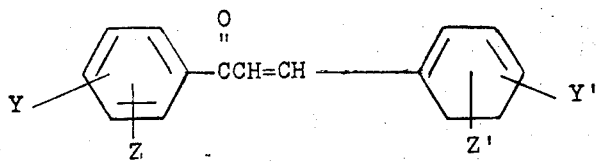

wherein Y, Y', Z and Z' are as defined above, with from about 1 to 2 mole equivalents of aqueous hydrogen peroxide, maintaining the pH of said reaction mixture between pH 8 and 11 while carrying out said reaction (a) in the presence of water and an organic solvent with appreciable water solubility, said solvent being selected from the group consisting of a $C_1$–$C_6$ aliphatic alcohol, a $C_5$–$C_8$ carbitol, a $C_4$–$C_6$ cellosolve, a $C_4$–$C_{10}$ glyme, an aliphatic $C_3$–$C_5$ ketone, ethylene glycol and propylene glycol, and (b) at a temperature between 0°C. and 60°C., whereby an epoxyketone is formed, said epoxyketone having the structure:

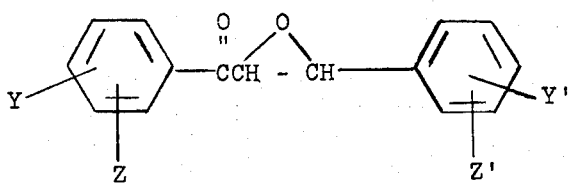

wherein Y, Y', Z and A' are as defined above, reacting said epoxyketone in the presence of a water-miscible solvent with from about 1 to 2 mole equivalents of hydrazine, hydrazine monohydrate or an aqueous solution thereof in the presence of from about 1% to 10% by weight of an acid selected from the group consisting of mineral acids and organic sulfonic acids, said reaction being carried out (a) at a temperature between about 20°C. and 100°C., whereby the formula (I) 3,5-diphenyl-2-pyrazolin-4-ol is formed, or (b) at a temperature between about 125°C. and 225°C., whereby the formula (II) 3,5-diphenylpyrazole is formed.

2. A process according to claim 1, wherein the pH of the reaction mixture is maintained between 8 and 11 by the addition to said mixture of from about 0.5 to 2.0 mole equivalents of a base selected from the group consisting of sodium carbonate, sodium bicarbonate, potassium carbonate, potassium bicarbonate and mixtures thereof.

3. A process according to claim 1, wherein said epoxyketone is formed by reaction of the appropriately substituted chalcone with hydrogen peroxide and from 0.5 to 1.0 mole equivalent of an alkali metal bicarbonate in the presence of water and a water-miscible solvent, at a temperature between about 0°C. and 60°C., and then converting to the said formula (I) pyrazolinol compound by reaction with hydrazine in an acid-catalyzed water-miscible solvent mixture at a temperature between 50°C. and 100°C.

4. A process according to claim 2, wherein said formula (I) pyrazolinol compound, prepared by the process of said claim 2, is dispersed in a solvent selected from the group consisting of a high boiling alcohol, a high boiling ketone, an aromatic hydrocarbon solvent and a chlorinated aromatic hydrocarbon solvent heating the latter pyrazolinol mixture to a temperature between about 125°C. and 225°C., whereby a formula (II) pyrazole is obtained.

5. A process according to claim 1, wherein from 0.5 to 1.0 mole of base is used to form the corresponding epoxyketone, reacting said epoxyketone at an elevated temperature with from 1 to 2 mole equivalents of said hydrazine, hydrazine monohydrate or aqueous solution thereof in the presence of said acid catalyst, azeotropically distilling water present in said reaction mixture, and heating the reaction mixture to a temperature between about 125°C. and 225°C., whereby said formula (II) pyrazole is obtained.

6. A process according to claim 5, wherein Y, Y', Z and Z' in said formula (II) pyrazole are each hydrogen; the solvent employed is xylene, and the acid catalyst is an organic sulfonic acid.

7. A process according to claim 5, wherein the base used in the preparation of the epoxyketone is an alkali metal bicarbonate, and the hydrazine used in reaction with the epoxyketone is hydrazine hydrate.

8. A process according to claim 7, whrein 0.5 to 1.0 mole equivalent of sodium bicarbonate is used in the preparation of said epoxyketone, and the acid catalyst used in the reaction of said epoxyketone with hydrazine hydrate is p-toluenesulfonic acid.

9. A process according to claim 1, wherein from 0.5 to 1.0 mole of base is used to form the epoxyketone; said epoxyketone is then reacted at a temperature between about 20°C. and 100°C. with from 1 to 2 mole equivalents of said hydrazine, hydrazine monohydrate or aqueous solution thereof in the presence of said acid catalyst, whereby said formula (I) pyrazolinol is obtained.

10. A process according to claim 9, wherein said reaction is carried out at a temperature between 50°C. and 100°C. with from about 1 to 2 mole equivalents of hydrazine, hydrazine hydrate or aqueous solution thereof in the presence of xylene and an organic sulfonic acid.

11. A process according to claim 9, wherein Y, Y', Z and Z' in said formula (I) pyrazolinol are hydrogen.

* * * * *